May 2, 1944.  H. P. LUHN  2,348,141
COMPUTING MECHANISM
Filed May 31, 1939  5 Sheets-Sheet 1

INVENTOR.
Hans P. Luhn
BY
ATTORNEYS

May 2, 1944.  H. P. LUHN  2,348,141
COMPUTING MECHANISM
Filed May 31, 1939  5 Sheets-Sheet 2

INVENTOR.
Hans P. Luhn
BY Darby & Darby
ATTORNEYS

INVENTOR.
Hans P. Luhn
BY Darby & Darby
ATTORNEYS

May 2, 1944.   H. P. LUHN   2,348,141
COMPUTING MECHANISM
Filed May 31, 1939   5 Sheets-Sheet 5

INVENTOR.
Hans P. Luhn
BY Darby + Darby
ATTORNEYS

Patented May 2, 1944

2,348,141

UNITED STATES PATENT OFFICE 2,348,141

COMPUTING MECHANISM

Hans P. Luhn, North Tarrytown, N. Y., assignor, by mesne assignments, to International Business Machines Corporation, a corporation of New York Application May 31, 1939, Serial No. 276,659

12 Claims. (Cl. 235—132)

The present invention relates to a computing mechanism and especially to a counter device.

More especially still, the invention is concerned with a counting device which is adapted to be automatically pre-set to perform a succession of counting operations and to control other mechanisms to alter their operation at times corresponding to the completion of the various ones of the succession of counting operations. Such a mechanism is applicable to textile machines, traffic control devices, chemical process control, display lighting, and to the control of many other machines and devices.

In the past, mechanisms have been devised to perform the functions hereinabove stated but such mechanisms were either inaccurate or were of limited selectivity or, on the other hand, if accurate and selective were so complicated and expensive as to be incapable of general application.

In one form of counter previously used a controlling element was used for each cycle of a machine and for each controlled element. Taking as an example a knitting machine a chain might be provided having positions thereon in which buttons could be installed. If this machine were to have a number of operations to be controlled there would be as many rows of button positions as operations and in each row there would be a button in every position at which the particular operation was to be performed. It can be seen that this would require an extremely long belt and an extremely large number of buttons installed at particular positions.

In another form of such predetermined counting mechanism the counter is controlled in a manner similar to that in which the ordinary punched card tabulator is controlled. This requires the use of nine controlling elements for each controlled element for each change in operation.

In my present invention it is possible to utilize either a punched card or a chain with buttons as described above, but whereas in the ordinary chain mechanism it is necessary to provide a number of buttons equal to the number of cycles of the machine, and in the punched card type of control it is necessary to provide nine buttons for each machine element to be controlled or for each counting wheel, in my system it is only necessary to use a number of controlling elements equal to approximately one-third of those necessary in the punched card arrangement.

As an example of the above, if a knitting machine were to operate through 50 cycles before a change in operation were to occur, there would have to be 50 buttons placed along a belt if the first system of control mentioned above were used, and then for each additional control there would have to be additional buttons in another row corresponding to the number of cycles of operation of the machine in the new condition. If a punched card system were used, or that is to say if the counter were of the decimal type, with a range of 0-999, then room for three times nine, or twenty-seven, holes would have to be provided for each counting operation. In my counter the combination of any ten holes, buttons, or similar controlling elements, disposed in a single row, makes it possible to count up to 1023.

In the decimal counter arrangement a controlling element according to its position in a row, or more properly a column, controls the setting of a single counting wheel in steps from 0 to 9. In the system of this invention, any single controlling element controls a single movement of one of the counting wheels or bars, as the case may be. In other words, in the decimal system nine different positions of one controlling element control the setting of one counting wheel or rack, while in my invention the position of a single control element determines the positioning in one of two alternative positions of a counting wheel or rack or similar device.

An object of the invention is to provide a counting mechanism which may be automatically set to perform a predetermined number of operations, which operations may occur at regular time intervals or otherwise.

A further object of the invention is to provide such a counting mechanism which will perform a succession of various numbers of operations in accordance with a predetermined setting.

Another object of the invention is to provide a counting device which may be controlled by a minimum number of controlling elements.

A still further object of the invention is to provide a counting device which will govern a machine to perform a predetermined succession of varied operations and to so arrange the device that it is operated by the machine, the operation of which it controls.

A still further object of the invention is to provide a predetermined automatic counting device which may be controlled by any of the commonly used forms of controlling elements, as for example chains with buttons thereon, cams, keyboards, punched cards or strips, electromagnetic instruments, etc., and which may be operated directly by such elements or indirectly in known manners.

Other objects and features of the invention will appear when the following description is considered in connection with the appended drawings, in which.

Figure 1:
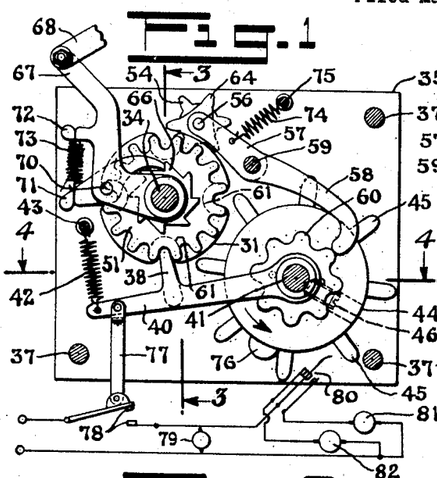
Figure 1 is a cross-sectional view of one form of counter in accordance with my invention taken on the plane of the line 1—1 of Figure 2.
Figure 2:
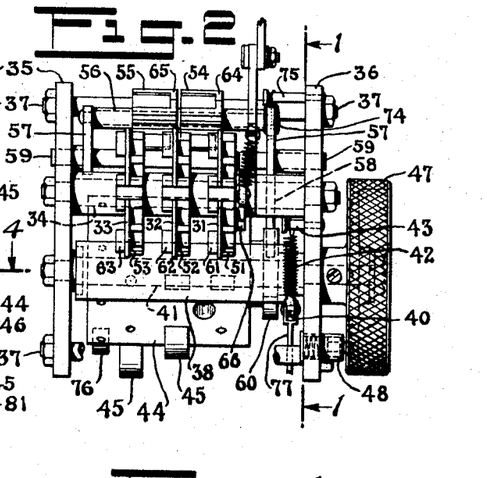
Figure 2 is a side view of the form of the invention shown in Figure 1.

Considering the first form of the invention as shown in Figures 1 through 8, it will be seen that the device comprises two end plates 35 and 36, Figures 1 and 2, fastened together by means of through-bolts 37 located at the corners of the plates. Extending between the plates 35 and 36 is a shaft 34, on which are rotatably mounted the notched selector discs 31, 32 and 33, see Figure 7. Cooperating with these three discs is a feeler bar 38 which is mounted on arms 40, which arms are rotatably supported on a shaft 41 which extends between plates 35 and 36 and is rotatably mounted therein. The arms 40 and feeler bar 38 are urged upwardly by means of a spring 42 stretched between the ends of one of the arms 40 and a pin 43 in plate 35. Also mounted on the shaft 41 is a drum 44 which is fixed to the shaft by means of the set screw 46. Shaft 41 is provided at its right hand end, as seen in Figure 2, with a knurled knob 47 so that it may be rotated to any desired position. The left hand surface of the knob 47 is notched at evenly spaced points through its surface to cooperate with a spring detent 48 fastened in plate 36. Three rows of drilled and tapped holes or their equivalent are provided in the drum 44 in which teeth 45 may be inserted to cooperate with the notches in the selector discs 31, 32 and 33. It will be readily seen that by rotating the drum 44 the various selector discs may be rotated into alternative positions or not, depending upon the position of the drum as well as upon the insertion or non-insertion of teeth 45 in the drum surface.

Figure 3:
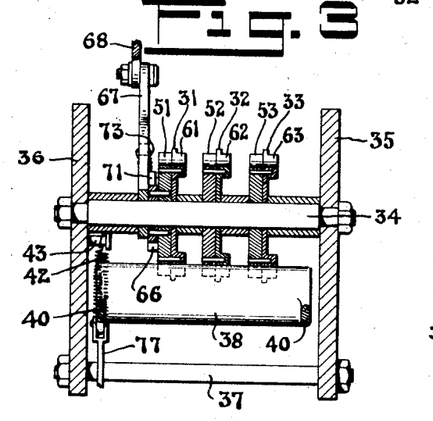
Figure 3 is a cross-sectional view of this first form of the invention, the section being taken on the line 3—3 of Figure 1.
Figure 4:
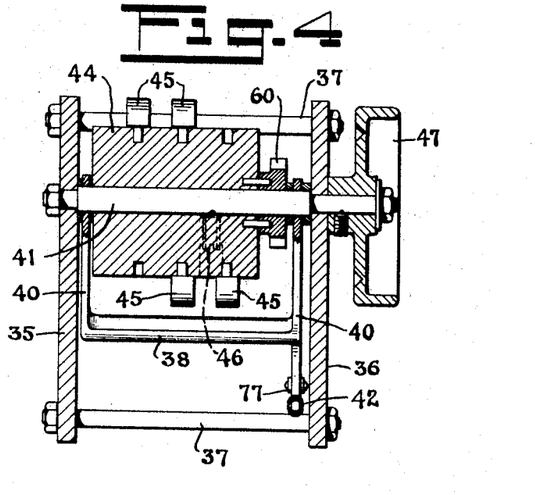
Figure 4 is a cross-sectional view of this same form of the invention taken on the plane of the line 4—4 of Figure 1.
Figure 5:
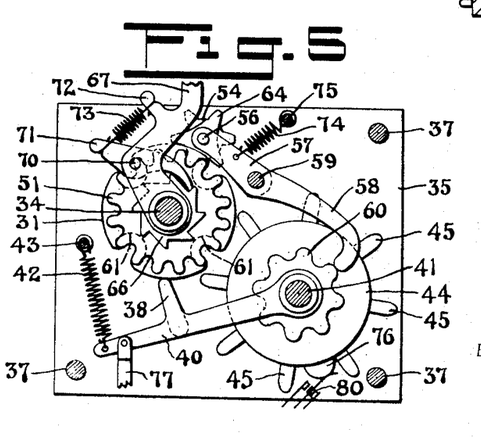
Figure 5 is a view similar to Figure 1 showing certain portions of the mechanism in their operated position.

Integral with each of the selector discs 31, 32 or 33 is a mutilated gear 61, 62, 63, respectively. In the form of the device shown, each of these gears is provided with four pairs of teeth, the tooth space between each pair of teeth being coincident with one of the four notches in the corresponding selector disc. Adjacent each selector disc on the other side thereof is a fully-toothed gear 51, 52, 53, each of these gears being pinned to the corresponding selector disc-mutilated gear. The structure just described is best shown in Figure 3, which figure likewise shows the spacing of the selector disc gear elements on the shaft 34 by means of various collars, not designated. Each of gears 51, 52, 53 is provided with sixteen teeth, as shown in Figure 1.

Cooperating with gears 51, 52, 53, and 61, 62, 63, are the pinions 54 and 55, which pinions are mounted on a shaft 56 supported in the two arms 57 which are, in turn, rotatably mounted on shaft 59 supported in the end plates 35 and 36. The downward and rearward extension 58 of the right hand one of the arms 57 terminates in a cam follower which cooperates with a multi-lobed cam 60 fixed to shaft 41 to rotate therewith. The cam follower of arm 58 is held against the cam 60 by means of a spring 74 stretched between the right hand arm 57 and a pin 75 in plate 36.

The pinion 54 is driven by mutilated gear 61 and drives the full gear 52, and in a similar manner pinion 55 is driven by mutilated gear 62 and drives full gear 53. It will be seen, therefore, that when gear 61 is rotated through four teeth, in the manner hereinafter described, gear 52 rotates through two tooth spaces, that is to say, during rotation of gear 61 through two tooth spaces pinion 54 is not affected, whereas during rotation of gear 61 through the succeeding two tooth spaces the pinion comes into mesh with gear 61 and serves to drive gear 52 through two tooth spaces. In a similar manner gear 53 will be rotated through two tooth spaces for each eight tooth spaces of rotation of gear 51. It will be obvious, from reference to the drawings, and particularly Figure 1, that each gear such as 61, 62, 63, together with its integral selector disc and mutilated gear, comprises, in effect, four repetitions of the same structure. It will also be obvious that while each step of movement is represented by two tooth spaces it would be possible to represent it by any other number of spaces, it being the ratio between the movements of the various notched discs which is important rather than the amount of movement of any disc.

Integral with each of the pinions 54 and 55 is a star wheel 64 or 65 which serves as a detent and prevents rotation of the pinions during such time as the pinion teeth lie in the space between pairs of teeth on the mutilated gears 61 or 62. In other words, these star wheels have a circular portion joining the teeth thereof, which portion lies on the periphery of the corresponding selector disc and prevents rotation of the star wheel and its connected pinion until such time as a tooth of the star wheel may rotate into the notch of the corresponding selector disc.

Rotatably mounted on the shaft 34 and fixed to the gear 51 is a ratchet wheel 66 which forms a portion of the driving mechanism for the counter. Cooperating with the ratchet wheel is a pawl 71 which is pivotally mounted at 70 on arm 67, which arm is rotatably mounted on shaft 34 and is connected by a link 68 to any suitable reciprocating member of the machine controlled. As is clearly shown in Figure 1, the pawl 71 is urged against the ratchet wheel 66 by means of a spring 73 stretched between the outer end of the pawl 71 and a projection 72 on the arm 67. It will be understood that the wheel 51 may be continuously driven from the controlled machine, if desired.

Extending downwardly from one of the arms 40 is a link 77 which controls the opening and closing of a pair of contacts 78 in an electrical circuit supplying current to the motor 79 driving the controlled machine. In view of the fact that it is frequently desirable to control either of two machine operations, there are provided in addition to the contacts 78 a set of make and break contacts 80 controlled by means of pins 76 which may be inserted in the drum 44 in the same manner as pins 45. It will be seen that when drum 44 is operated to such position that any pin 76 cooperates with the tongue member of the make and break contact set 80, a motor 81 will be in circuit, whereas when no such pin 76 operates upon the contacts 80 the motor 82 will be in the circuit, these motors serving to alter the machine operations in any suitable manner.

Figure 8:
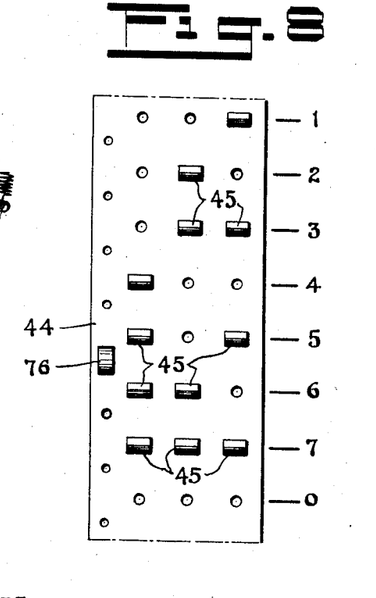
Figure 8 is a development showing the setting control drum of the mechanism of the foregoing figures with pins inserted therein to represent the numerals from 0 through 7.

Referring to Figure 8, it will be seen that positions for the pins 45 are provided in twenty-four different locations on the drum 44, there being eight such possible locations per row. In Figure 8 pins are shown in place representing the numerals 1 through 7 and 0, in order. It will be obvious that the pins may be re-located so as to represent these same numerals in any other order, or to represent any combination of the various numerals through 7.

Figure 6:
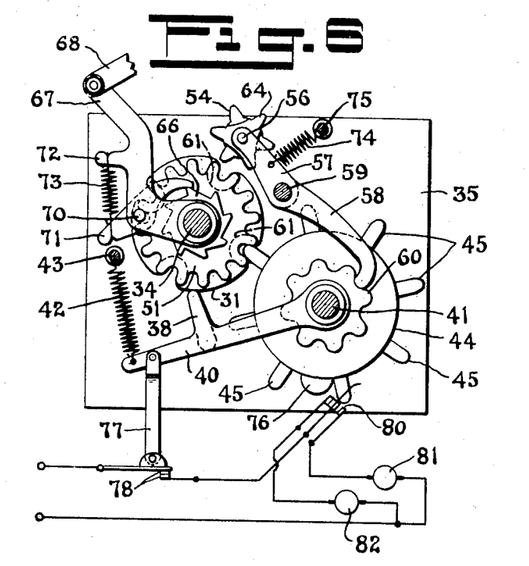
Figure 6 is a view similar to Figure 1 showing the operation of the setting mechanism.
Figure 7:
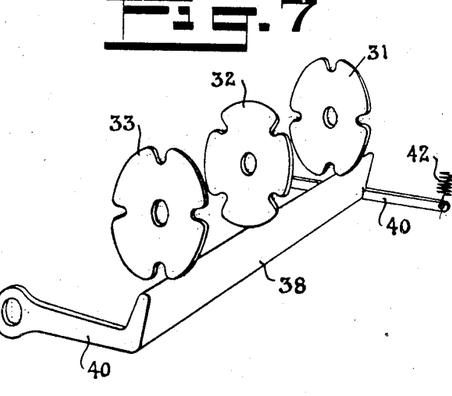
Figure 7 is a fragmentary view showing the mode of cooperation of certain notched selector discs with a feeler bar.

In operating this device the knob or hand wheel 47 is rotated to its first position, representing in this case, as shown by Figure 8, number 1, which is the number of operations to be performed. As this wheel is rotated the drum 44 rotates with it and a pin in the right hand row of pins causes the selector disc 31 to be advanced one step. During this advance the cam 60 causes pinions 54 and 55 to be elevated and disengaged from their meshing gears, as shown in Figure 6, so that there is no movement of these pinions during the setting operation. Movement of the selector disc 31 causes the feeler bar 38 to move downwardly and close contacts 78, thus energizing the motor 82. Upon such energization the machine to be controlled starts to operate, and after passing through a cycle of operation actuates the arm 68 and causes the pawl 71 to advance the ratchet wheel through two tooth spaces in the manner shown in Figure 5, thus positioning the selector disc with its following notch in line with the feeler bar 38 which then moves upwardly under urge of spring 42 and causes contact 78 to be again opened.

At this time the hand wheel 47 is advanced another step, causing a pin 45 in the second column to mesh with selector disc 32 and advance it one step or two tooth spaces. This advance again causes the feeler bar to be lowered and again closes the circuit by means of closing contact 78 so that the machine again operates and through the link 68 and pawl 71 drives the ratchet wheel through one step for each cycle of rotation, it being understood that one step of the ratchet wheel corresponds to two tooth spaces on the gear 51. At the first advance of the ratchet wheel, gear 51 is advanced two tooth spaces from its position, as is gear 52. This advance is ineffective since the feeler bar 38 now lies on the surface of the disc 31 although there is beneath it a notch in disc 32. During the next advance the disc 31 comes into position with the succeeding notch in line with the feeler bar 38. Thus, both discs having notches in alignment with the feeler 38, the feeler is permitted to rise under action of the spring 42, as previously described, and again open the contacts 78.

It will be seen that by turning the hand wheel 47 one step after completion of each operation, the controlled machine may be caused to successively perform one, two, three, and so on, through seven, cycles of operation in sequence. It will be likewise obvious that by causing the knob 47 or its equivalent to be operated whenever the feeler bar 38 falls into the aligned notches of the selector disc, the machine may control itself and the hand operation of the hand wheel may be dispensed with.

It will furthermore be obvious that by inserting pins into the various ones of the holes of the drum 44 the succession of operations may be altered so that any number of cycles up to seven may be included in each count. Again it will be obvious that by placing pin 76 in the drum 44 at desired locations the motor 81 may be controlled automatically so that it operates in place of the motor 82.

It is further apparent that by the addition of selector discs and corresponding gears the capacity of the counter may be increased to any desired extent, the capacity being substantially doubled by the addition of each selector disc. It will be seen that the pinions 54 and 55 together with the mutilated gears such as 61, 62, 63, and the full gears 51, 52, 53, constitute a transfer mechanism which is similar to the tens transfer mechanism used in ordinary counting mechanisms but that it is arranged to operate as what has been called a binary transfer, rather than as a decimal one.

In Figures 9 through 14 there is illustrated a second embodiment of the invention which, while generally similar to the first embodiment, differs in that the feeler bar 38 is not used and other mechanism is substituted therefor. In the first design the selector discs were set by the pins on the drum and the feeler bar responded to the drum positions. In the second design the discs are unaffected by the controlling elements or pins of the drum and the drum movement is effective to position elements replacing the feeler bar, which elements thus become, in addition to the means of response, the means for setting up the desired count. It is obvious that in the first embodiment the count is set up and units successively subtracted therefrom until the zero point is reached, while in this embodiment the count is set up and units successively added until this count is reached.

Figures 9 through 14 are schematic and show only those portions of the mechanism which have been changed in this embodiment of the invention and the portions cooperating directly therewith. In these figures it will be seen that the arms 40, which are similar to those of the first embodiment, carry in place of the feeler bar 38 a shaft 101 on which there are pivoted three bellcranks, 103, 104 and 105, one for each selector disc, each of which has a bifurcated arm extending upwardly in position such that either of the bifurcations may engage in a tooth space of the disc. In this embodiment of the invention the pins 45 on the drum are of somewhat different shape than in the first embodiment and are designed to contact with the substantially horizontal arm of the bellcrank levers to rotate them about the shaft 101. As before, the arms 40 are urged to their upper position by means of spring 42. Each individual bellcrank is returned to its normal position by means of a coil spring 106 coiled about the shaft 101. A rod 107 acts as a stop for all bellcranks.

Figure 10:
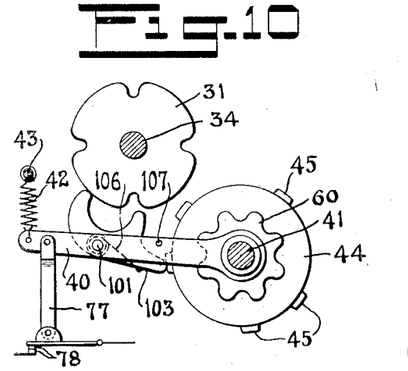
Figure 10 is a fragmentary view similar to Figure 9 showing the manner in which the setting drum cooperates with the bifurcated arms to predetermine the count of the instrument.

When the drum 44 is turned and a tooth 45 strikes the horizontal arm of bellcrank 103, the bellcrank is rotated in a clockwise direction, as seen in Figure 10, about the shaft 101 and the right hand bifurcation of the bellcrank lever is caused to disengage from the notch of the disc 31 while the left hand bifurcation bears against the surface of the disc and causes the arms 40 to be lowered. Lowering of arm 40 causes closure of contact 78 due to the movement of link 77 in the same manner as before.

Figure 9:
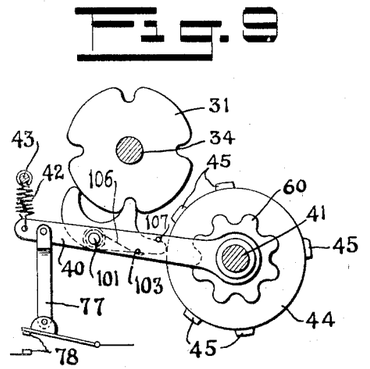
Figure 9 is a fragmentary side view of a portion of the mechanism showing a modification of the device in which bifurcated arms are substituted for the single feeler bar of the first form of the invention.
Figure 11:
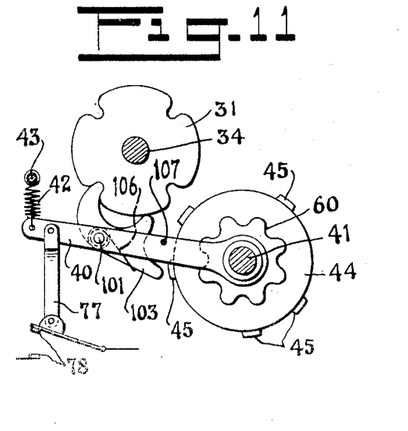
Figure 11 is a view similar to Figures 9 and 10 showing the position of the instrument when the count has been completed.
Figure 12:
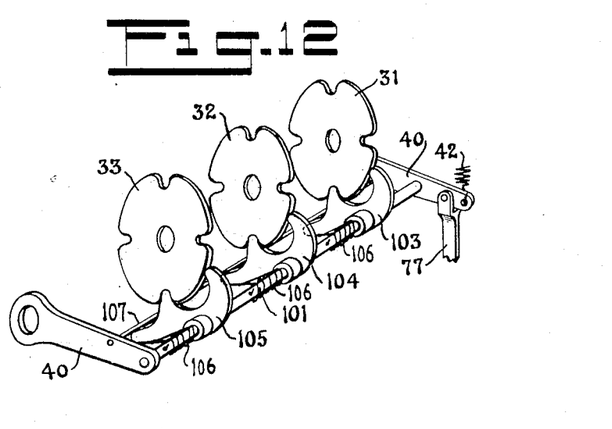
Figures 12, 13 and 14 are perspective views respectively similar to Figures 9, 10 and 11, showing, however, the position of three notched discs and their respective bifurcated arms rather than of the single disc and arm of Figures 9, 10 and 11.
Figure 13:
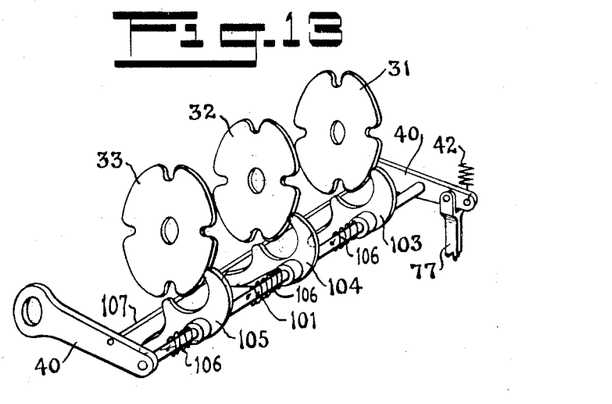

Referring now to Figure 12, it will be seen that the three discs 31, 32 and 33 are aligned and that the left hand bifurcations of bellcranks 103, 104 and 105 (the right hand bifurcations as seen in Figures 9, 10 and 11) lie in the notches of the corresponding discs. Assuming now that the next step of movement of the disc is such as to represent the numeral 5, then upon such operation the condition shown in Figure 13 will obtain, that is, bellcranks 103 and 105 will be acted upon by pins 45 on the setting drum 44 and will cause the right hand bifurcations as seen in this figure to rest upon the surface of the corresponding discs and the left hand bifurcations to disengage from the notches of the discs.

Figure 14:
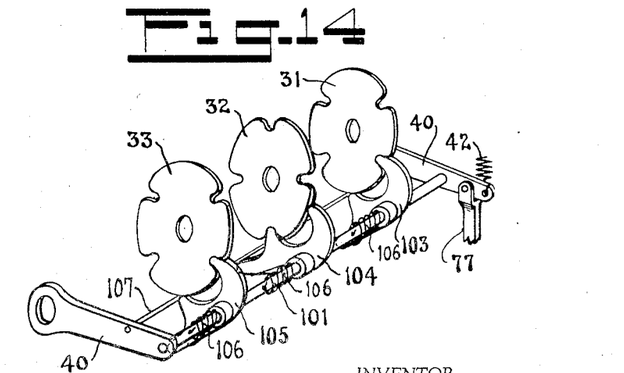

If now the discs are operated as part of the counting gear train in the same manner as in the embodiment previously described, on the fifth step of movement the discs will have reached the position shown in Figure 14 in which the right hand bifurcations of bellcranks 103 and 105 will enter notches in the disc while the left hand bifurcation of bellcrank 104 will enter the notch in the disc. When this condition obtains the spring 42 will raise arms 40 and link 77 to break the motor circuit in the same manner as previously described.

Simultaneously with the next setting of the bell cranks 103, 104 and 105, the selector discs are re-set to their 0 position, this being done by means of permanent teeth on the drum, which teeth operate in the plane of the mutilated gears 61, 62 and 63 engaging with them when they are in an "on" position and advancing them one step forward to the "off" position. During this re-setting operation the carrying pinions, such as 54 and 55, are taken out of mesh with the gears 51, 52 and 53, and 61, 62 and 63, in the same manner as described when the first embodiment was considered. In connection with these carrying pinions it should be noted that they are located one step in advance of their position in the first embodiment, this being due to the fact that in this second design the selector discs are aligned in an "off" position representing 0, whereas in the first embodiment they were moved by the setting drum to positions representing particular desired numerals.

If desirable, the mechanism of the second embodiment of the invention may be operated without re-setting to 0, in which case the pins 45 on the drum 44 are located to represent combinations corresponding to the total of all previous counts and the new count. For example, if the first count were 2 (which may be represented by a tooth on the drum for the middle bellcrank 104, and no tooth on the drum for the first and last bellcranks 103 and 105), and the next count were to be 4 then the combination on the drum should be represented by pins for cooperating with the second and third bellcrank levers 104 and 105 and no tooth pin on the drum for the lever 103, this combination representing the numeral 6 which is the total of the two counts 2 and 4. When this system is utilized it is only necessary to re-set the selector discs to 0 positions, once at the end of each complete cycle of the setting drum. The mechanisms necessary to perform this re-setting function are not illustrated since they are obvious. This mechanism comprises, in brief, a binary number system counter.

The third embodiment of my invention, illustrated in Figures 15 through 21, is generally similar to the first embodiment but differs therefrom in that the selector discs are stationary and the feeler bar rotates about them. Although identical in principle and very similar in construction, the mechanism of this third embodiment of my invention appears quite different from that of the first embodiment, and for this reason will be described in detail.

Figure 18:
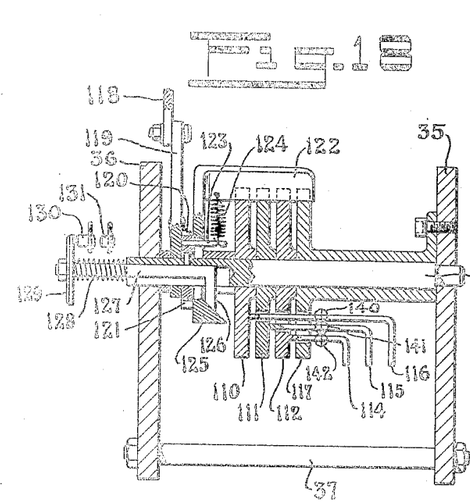
Figure 18 is a cross-sectional view of the device of Figure 15 taken on the line 18—18 of Figure 16.

The counter comprises the end plates 35 and 36 between which a shaft 113 extends. Rotatably supported upon this shaft are the three selector discs 110, 111 and 112. Likewise supported on the shaft 113 is a fourth disc 117 which is prevented from rotating due to the fact that it has a hub which extends to the right, as seen in Figure 18, and is fastened to the end plate 35. The three discs 110, 111 and 112 are rotatable to either one of two positions under control of the setting drum 146, which drum is mounted on a shaft 145 supported between the end plates in the same manner as the shaft 41 of Figure 4. Shaft 145 carries a knob or hand wheel 148 which is similar to the knob or hand wheel 47 and which is held in its set position by a spring detent exactly similar to the spring detent 48 of the first embodiment of the invention. Each selector disc 110, 111 and 112 has fastened to it an arm 114, 115 or 116. These arms extend to the right, as seen in Figure 18, each arm passing through the selector discs lying to the right of the disc to which it is attached and being bent over at its end to lie in the path of a row of pins 147 on the drum 146. The selector discs are normally rotated to the extreme counter-clockwise one of their two positions by means of springs 140, 141, 142 stretched between the arms 114, 115 and 116 and a bracket 143 supported on the frame bolts and fastened to the upper right hand one of these frame bolts by means of the screw 144. By reference to Figure 18 it will be seen that the arms 114, 115 and 116 also pass through a slot in the shielding disc 117.

Figure 17:
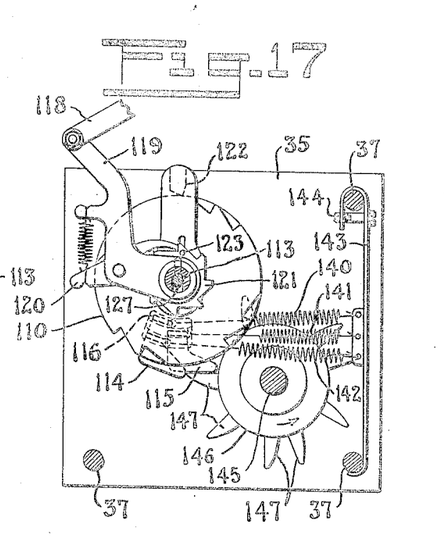
Figure 17 is a view similar to Figure 16 showing the positions of the various mechanisms when the setting drum has been rotated through one tooth space.

From the above description it will be seen that when the setting drum is rotated to any particular position the teeth 147 thereon cause some or all of the arms 114, 115 and 116 to move to the left, as seen in Figure 17, and to thus advance the corresponding selector discs to the extreme clockwise one of their two positions.

The feeler bar 122 which corresponds to the bar 38 of the first embodiment of the invention, is mounted to rotate about the selector discs and is likewise arranged to be radially movable so that it may lie in notches of the discs or may lie on the surface of the discs, depending upon its position with respect to aligned notches in the various discs. The feeler bar 122 is provided with a right-angled extension which is mounted upon the shaft 113 and is freely rotatable thereon. In addition to being rotatable upon this shaft, the extension is slotted so that the feeler bar may move radially being normally held toward the center by means of a spring 124 extending from the horizontal portion of the bar 122 to a pin 123, which pin is inserted in a ratchet wheel 121 and projects through a slot in the extension of the feeler bar. Diametrically opposite the horizontal portion of the feeler bar the extension of that bar carries a cam surface or wedge 125 for a purpose hereinafter described.

The ratchet wheel 121 previously mentioned is mounted upon the shaft 113 adjacent the feeler bar extension. This ratchet wheel is pinned to the shaft and causes the shaft to be turned with it. The ratchet wheel is driven by means of the pawl 120, which is pivotally mounted on the arm 119, which arm is connected by the link 118 to the mechanism to be controlled in exactly the same manner as the parts 71, 67 and 68 of Figure 1.

Shaft 113 is slotted at its left hand extremity, as shown in Figure 18, so that a member 127 having a right-angled extension 126 may be inserted therein and may be moved from left to right, being held in its left hand position by means of a spring 128. The end of the extension 126 is a cam follower which cooperates with the cam or wedge 125. At the opposite end of the member 127 there is a disc 129 which bears against a contact 130 of the contact pair 130, 131, these contacts corresponding with the contacts 78 of Figure 1.

Figure 19:
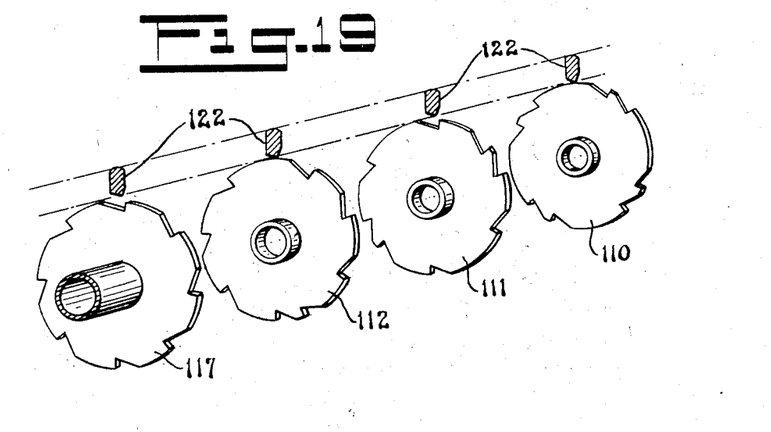
Figure 19 is a fragmentary perspective view of the notched discs and feeler bar of Figure 15 showing a particular relationship thereof.

In Figure 19 the three selector discs 110, 111 and 112, together with the shielding disc 117 and the feeler bar 122, are shown in perspective. It is obvious from this view, that as long as the notches in these four discs are not in alignment the feeler bar must rest upon the surface of the non-aligned disc or discs and that when the discs are in alignment the feeler bar will rest in the aligned notches of the various discs. By reference to Figure 18 it is seen that when the feeler bar is in the aligned notches of the various discs the parts lie in position such that the contacts 130, 131 are open but that as soon as the discs are rotated to a position in which the notches are not aligned the feeler bar is caused to move radially outward, thus moving the wedge 125 against the cam edge of extension 126 and forcing member 127 to the right against the tension of spring 128, thus closing the contacts 130, 131.

Figure 20:
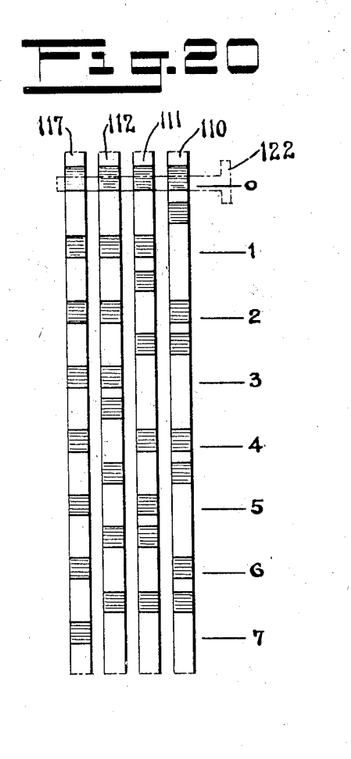
Figures 20 and 21 are developments of the notched discs and shield of Figure 19, illustrating particularly the function of the shield.
Figure 21:
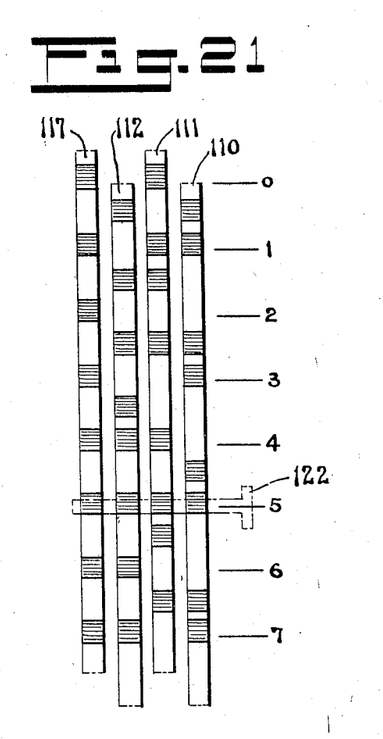

Figures 20 and 21 are developments of the selector discs, Figure 20 showing the discs in their aligned or 0 position and Figure 21 showing the discs in a position representative of the numeral 5. In these two drawings the feeler bar 122 is shown in position in the aligned notches of the discs. These figures makes clear the reason for supplying the shielding disc 117.

Referring to Figure 21, it will be clear that if this disc 117 were not provided the feeler bar in rotating from the position in which it is shown in Figure 20 to that shown in Figure 21 would have to pass over a position midway between numerals 2 and 3 in which notches in the three selector discs are aligned and the feeler bar would, therefore, move radially inward and cause breaking of the circuit at the contacts 130 and 131. Since the showing of Figure 21 represents, as stated above, the position of the discs for the numeral 5, it is obvious that this is an incorrect operation. As is seen from Figures 20 and 21, the shielding disc 117, having equally spaced notches at the numeral positions only, prevents such false operation and causes the feeler bar to continue rotating until it has reached the 5 position since notches in the three selector discs aligned with a notch in the shielding disc permit this feeler bar to move radially inward and control the operation of the mechanism.

While the operation of this embodiment of the invention has been described above, it will be repeated here in order that it will be perfectly clear.

Figure 15:
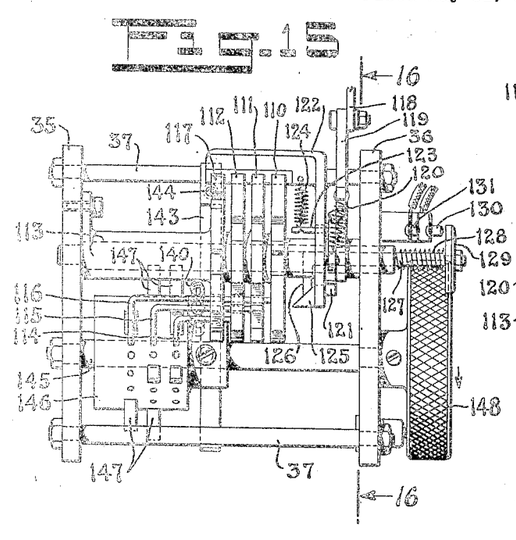
Figure 15 is a side view of a third embodiment of my invention differing from the first two embodiments in that the notched discs are stationary and the feeler bar rotates about them.
Figure 16:
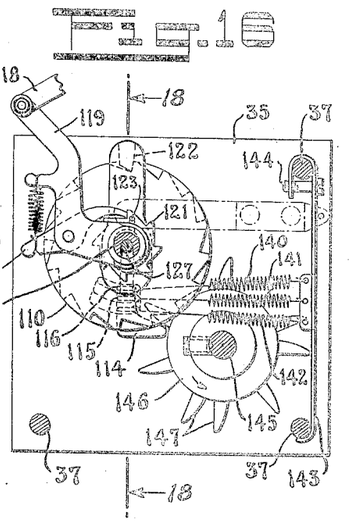
Figure 16 is a cross-sectional view of the device of Figure 15 taken on the plane of the line 16—16 of that figure.

If we assume that the selector discs are at their 0 position and that the machine is to be operated through a succession comprising one cycle, two cycles, three cycles, etc., up to seven, the first step in the operation will be to rotate the setting drum 146 to its first position, which will cause a tooth 147 in the right hand row, as seen in Figure 15, to engage arm 114 and rotate selector disc 110 clockwise, as seen in Figure 17. This rotation of the selector disc, due to the shape of the notches in the discs, will cause the feeler bar to be moved radially outward against tension of spring 124, this movement in turn causing member 127 to be moved inwardly, closing contacts 130 and 131. Upon such closure the mechanism controlled will start operation and during operation through one cycle will operate the ratchet wheel 121 and rotate the feeler bar 122 one step in a clockwise direction. When the feeler bar has been thus advanced one step, it will be moved radially inward by the spring 124 since the notches in the selector discs are aligned at this point, and due to action of the various mechanism above described contacts 130 and 131 will be opened and the driving motor or other control stopped. Thereupon the setting drum will be rotated another step ahead, thus causing the second of the selector discs, that is, disc 111, to be rotated clockwise one step and permitting the previously rotated disc 110 to be restored to its 0 position.

The movement of the selector disc will again cause the feeler bar to be moved radially outward, resulting in closure of contacts 130 and 131 and re-starting of the controlled mechanism. After this mechanism has gone through another cycle of operation the feeler bar will have been advanced to the 2 position, at which position notches in the selector discs and the shielding disc are again in alignment. It will be seen that the total number of operations now completed is two, and that with respect to the setting by the drum this embodiment of the invention is similar to the second embodiment of the invention in that the number represented by the setting disc is the sum of last count and all previous counts. After the counting device has passed through its complete cycle the succession of counts will be repeated, the feeler bar being restored to the 0 position by virtue of the fact that it has passed through a complete revolution.

While I have shown discs in the various designs as the carriers of the combination, and while this is a preferred form, it will be obvious that notched bars or other similar mechanism may be utilized in place of the discs. It will be further understood that the number of selector discs or bars or like devices is not limited but may be increased to any desired number to provide the maximum count desired, and that the number of notches or gears may be increased accordingly. Furthermore, the mechanisms may be operated in a direction reversed from that illustrated by minor and obvious changes in the driving mechanism. In addition, the levers or arms 40 or their equivalent, the feeler bar 122, may be associated with the driving levers 67 or with the teeth of the shielding disc 117 in such manner as to block further operation of the driving levers or the feeler bar upon completion of a count.

It will likewise be apparent that a feeler bar may be added to any of the mechanisms to cause operation of additional controls prior to operation of the controls mentioned. Such an additional bar may extend over all the discs except that of the lowest order to cause operation of the additional controls one step in advance of the ordinary operation or over all but the two lowest order discs to cause operation three steps prior to the ordinary control, etc.

Although I have described the mechanism and the principles of operation thereof as applied to an automatically pre-settable counter device, it will be understood that these principles are equally applicable to any of the many forms of counting mechanism, regardless of for what purpose a counting operation is effected. Therefore, I desire to have the foregoing description of the various mechanism embodying one or more forms of my invention regarded in the illustrative sense rather than in the limited sense.

What I claim is:

1. In a computing mechanism, the combination of a plurality of selector discs each having two effective positions, the discs being arranged to form a counting train, movement of the first disc of the train from its first to its second position representing a unit, movement of the second disc from its first to its second position representing a base number, movement of successive discs from their first to their second positions representing the base number raised to successive arithmetically ascending powers, mechanical means comprising a movable member and adjustably located pins thereon to set said discs individually and concurrently to register numbers thereon, each number being represented by the values of the discs moved, and means rotatable relatively to said discs, operable upon the completion of a count equal to the sum of the registered numbers for indicating the completion of the count.

2. In an automatically pre-determined counter, in combination, a plurality of selector discs arranged as elements of an accumulator, presettable means set to represent various numbers which indicate numbers of operations to be performed and for intermittently setting said discs individually to represent said varying numbers of operations to be performed, means operable during the periods between setting operations to operate said discs as elements of an accumulator, and means operable upon restoration of said discs to normal position to initiate the next successive setting operation.

3. In a counting device adapted to perform a pre-determined series of counting operations, the combination of a plurality of selector elements having notches normally in alignment, a binary transfer mechanism interconnecting said elements, control means comprising a plurality of control elements arranged in rows and columns, each row of elements representing in accordance with the presence or absence of such elements in definite control element positions the magnitude of one of a series of counting operations, the element of each column cooperating with a corresponding one of said selector elements to move it individually from its normal position to another position, means to advance said control means step by step, and means to operate said selector elements while interconnected by said transfer mechanism and intermediate the steps of movement of said advancing means to restore said selector elements to normal position.

4. In a counting device, the combination of a plurality of notched selector elements arranged to normally have their notches in effective alignment, means for setting said elements with respect to each other comprising a plurality of control elements arranged in rows and columns, each row of elements representing in accordance with the presence or absence of such elements in definite control element positions the magnitude of a series of counting operations, the elements of each column cooperating with a corresponding one of said selector elements to move it from its normal position to another position so that the notches are in effective alignment at a position removed from said position of normal alignment in proportion to a number represented, means to cooperate with said notches to determine the existence of a condition of effective alignment, and means to move said determining means along said selector elements to the position of effective alignment.

5. In a device of the class described, an accumulator comprising a plurality of accumulator wheels and a transfer mechanism interconnecting said wheels, a selector disc arranged for rotation with each accumulator wheel, means for momentarily disengaging said transfer mechanism from said wheels, and means automatically operable during such disengagement to individually set said wheels and discs to positions representative of a numeral in a code.

6. In a device of the class described, the combination of an accumulator having a binary transfer mechanism, means for rendering said transfer mechanism ineffective, means coordinated with said rendering means for setting the units of said accumulator individually while said transfer mechanism is ineffective, said setting means comprising pins cooperating with respective units of said accumulator, and means for restoring said units to normal position and said accumulator to zero.

7. In a device of the class described, an accumulator comprising a plurality of accumulator gears arranged on a common axis, a selector disc integral with each accumulator gear, a binary transfer mechanism normally operable to insert a unit upon a higher order wheel after insertion of the second of two units upon the preceding lower order wheel, notches in said selector discs, said notches being in alignment at definite positions when said accumulator registers zero, means to set said accumulator wheels and selectors to positions representative of numbers other than zero, means coordinated with said setting means and automatically operable therewith for rendering said transfer mechanism inoperable during such setting, and means to operate said accumulator disc of lowest order step by step to cause said accumulator wheels to again assume their zero positions and said notches in said selector discs to again be in alignment after a number of steps of operation equal to the set number.

8. In a device of the class described, in combination, a plurality of notched code selector discs rotatably mounted on a common shaft, a binary transfer mechanism interconnecting said discs, means to drive the first disc step by step and succeeding discs through said transfer mechanism, means responsive to the positioning of said discs to initiate operation of controlled mechanism, said means including a bifurcated feeler arm for each disc, said arms being movable to either of two positions to determine the particular position of said discs to which said feeler means shall respond.

9. In a device of the class described, in combination, a code selector device comprising a plurality of notched selector discs arranged as a counter train, means to operate the lowest order disc of said train step by step under drive of a machine to be controlled, a binary transfer mechanism interconnecting said discs to drive the remaining discs of the train, means to position said discs to represent numbers of operations to be performed, means to indicate the restoration of discs to normal position, means under control of said indicating means to energize said positioning means and deenergize said controlled machine upon movement of said discs to normal position, said means also re-energizing said machine upon movement of said discs from normal position upon advance of said disc-positioning means to represent a new number.

10. In a device of the class described, in combination, a plurality of two position code selector discs, means to position said selector discs to represent numbers, and feeler means operable to indicate the position of said discs, said means comprising a feeler bar mounted for rotation about said discs and adapted for radial movement with respect to the discs, a cam fixed to said feeler, and a cam follower reciprocally mounted for movement under control of said cam to indicate said aligned condition.

11. In a machine of the class described, a binary counting mechanism having subtractive transfer mechanism between the several orders thereof, a unitary adjustable setting device for concurrently adjusting the elements of the counting mechanism to represent thereon a number in the binary system of notation, said device causing the disabling of the transfer mechanism during said concurrent setting, and means for effecting repeated unit entries into the counting mechanism to successively set up a series of numbers descending from the set number to zero.

12. In a device of the class described, in combination, a pattern control element, selectively settable control elements positionable in one or more of a plurality of element receiving positions arranged in a line on said control element, different combinations of elements representing different numbers, a settable counting device, and means operable by said elements to effect a setting of said counting device in accordance with the number represented by the combinational arrangement of the control elements.

HANS P. LUHN.